US010135755B1

(12) United States Patent
Lincourt, Jr. et al.

(10) Patent No.: US 10,135,755 B1
(45) Date of Patent: Nov. 20, 2018

(54) INFORMATION TECHNOLOGY INFRASTRUCTURE DISCOVERY UTILIZING DISCOVERY ADAPTERS

(71) Applicant: EMC IP Holding Company LLC, Hopkinton, MA (US)

(72) Inventors: Robert A. Lincourt, Jr., Pawtucket, RI (US); Mark Kaberman, Framingham, MA (US); Susan Young, North Scituate, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 173 days.

(21) Appl. No.: 15/272,704

(22) Filed: Sep. 22, 2016

(51) Int. Cl.
*G06F 15/16* (2006.01)
*H04L 12/927* (2013.01)
*H04L 12/24* (2006.01)

(52) U.S. Cl.
CPC ........ *H04L 47/803* (2013.01); *H04L 41/0213* (2013.01); *H04L 41/12* (2013.01)

(58) Field of Classification Search
CPC .............................. H04L 47/503; H04L 41/12
USPC ........................................................ 709/217
See application file for complete search history.

(56) References Cited

U.S. PATENT DOCUMENTS

| | | | |
|---|---|---|---|
| 8,510,762 B1 * | 8/2013 | Gregorio | G06F 8/36 717/104 |
| 9,372,688 B1 * | 6/2016 | Ben-Yair | G06F 8/427 |
| 9,852,015 B2 * | 12/2017 | Ben-Yair | G06F 9/449 |
| 2002/0112058 A1 * | 8/2002 | Weisman | G06F 9/4411 709/227 |
| 2002/0143819 A1 * | 10/2002 | Han | G06F 17/3089 715/237 |
| 2004/0225952 A1 * | 11/2004 | Brown | G06F 8/20 714/819 |
| 2007/0011281 A1 | 1/2007 | Jhoney et al. | |
| 2007/0094301 A1 * | 4/2007 | Rimer | G06F 9/4493 |
| 2007/0294237 A1 | 12/2007 | John et al. | |
| 2008/0137670 A1 * | 6/2008 | Ebrom | G06F 9/54 370/400 |
| 2008/0301294 A1 * | 12/2008 | Hellenthal | H04L 29/06 709/224 |
| 2012/0110174 A1 * | 5/2012 | Wootton | G06F 21/564 709/224 |
| 2013/0205019 A1 * | 8/2013 | Oellermann | H04L 41/5038 709/224 |

(Continued)

*Primary Examiner* — Karen C Tang
(74) *Attorney, Agent, or Firm* — Ryan, Mason & Lewis, LLP

(57) ABSTRACT

A method comprises building a registry of available discovery adapters, obtaining discovery data from information technology infrastructure, generating a discovery plan comprising a list of discovery adapters by matching one or more information technology resource types identified in the discovery data to information technology resource types associated with respective ones of the available discovery adapters, providing the discovery data to the discovery adapters in the list to execute a discovery run comprising the discovery adapters analyzing the discovery data and storing information on information technology resources in a discovered resources repository, and dynamically adjusting allocation of the information technology resources based on the information stored in the discovered resources repository.

20 Claims, 11 Drawing Sheets

(56) References Cited

U.S. PATENT DOCUMENTS

| | | | | |
|---|---|---|---|---|
| 2014/0019497 A1* | 1/2014 | Cidon | ............... | G06F 17/30194 |
| | | | | 707/827 |
| 2015/0095923 A1* | 4/2015 | Sarid | ......................... | G06F 8/30 |
| | | | | 719/328 |
| 2015/0373124 A1* | 12/2015 | Bhalla | ..................... | H04W 4/70 |
| | | | | 709/202 |
| 2017/0102972 A1* | 4/2017 | Ben-Yair | ................. | G06F 9/449 |
| 2017/0163480 A1* | 6/2017 | Vergara | ................. | H04L 41/082 |
| 2017/0185488 A1* | 6/2017 | Kumarasamy | ...... | G06F 11/1451 |

* cited by examiner

```
@Component("GenericDiscoveryAdapter")
public class GenericDiscoveryAdapter extends DiscoveryActor implements DiscoveryAdapter { public static void register(DiscoveryAdaptersRegistry registry) {
    DiscoveryAdapterRegistrationInfo registrationInfo = new DiscoveryAdapterRegistrationInfo();
    registrationInfo.setName("Generic discovery adapter");
    registrationInfo.setDescription("Generic discovery adapter");
    registrationInfo.setSupportedResources(Arrays.asList("Generic"));
    registrationInfo.setBeanName("GenericDiscoveryAdapter");
    registry.registerDiscoveryAdapter(registrationInfo);
} private static final String PATH = "/rest/v1/ManagedSystems";

private static final String CHASSIS_PATH = "/ChassisCollection",

@Inject
private RestClient GenericRestClient;

@Inject
private DiscoveryJobRepository discoveryJobRepository;

@Inject
private DiscoveryOutcomeRepository discoveryOutcomeRepository;

@Inject
private DiscoveredResourcesHandler discoveredResourceHandlerConsoleImpl;

@Inject
private AkkaSpringExtension extention;

@Override
public List<String> getSupportedResources() {
    return Arrays.asList("Generic");
}
```

FIG. 8A

```
@Override
public void discover(Object payload) throws Exception {
  if (!(payload instanceof DiscoveryOutcome)) {
    throw new FatalDiscoveryException("Wrong message type received by StartDiscoveryActor. Expected "
      + "\"DiscoveryOutcome\", but received "
      + payload.getClass().getName());
  }

DiscoveryOutcome outcome = (DiscoveryOutcome) payload;
  DiscoveryJob discoveryJob = discoveryJobRepository.findOne(outcome.getJob());
  String path = discoveryJob.getUrl() + PATH;
  log.info(MessageFormat.format("Discovery request received for managed system {0}", path));

// discover managed system
  DiscoveredResource managedSystemResource = new DiscoveredResource();
  managedSystemResource.setType("ManagedSystem");
  managedSystemResource.setPath(PATH);
  managedSystemResource.setUrl(discoveryJob.getUrl().toString());
  managedSystemResource.getParents().put("Generic", discoveryJob.getUrl());
  managedSystemResource.setOutcome(outcome.getId());
  ResponseEntity<String> response = GenericRestClient.executeQuery(path, HttpMethod.GET);
  if (!response.getStatusCode().is2xxSuccessful()) {
    managedSystemResource.setStatus("Failed");
    discoveredResourceHandlerConsoleImpl.saveResource(managedSystemResource);
    outcome.setStatus("Failed");
    String msg = "Unable to discover managed systems: " + response.getStatusCode().getReasonPhrase();
    outcome.setMessage(msg);
    discoveryOutcomeRepository.save(outcome);
    throw new FatalDiscoveryException(msg);
  }
  managedSystemResource.setNativeData(response.getBody());
```

FIG. 8B

```
log.info("Managed system discovered. Discovering chassises");
path = path + CHASSIS_PATH;
response = GenericRestClient.executeQuery(path, HttpMethod.GET);
if (!response.getStatusCode().is2xxSuccessful()) {
    managedSystemResource.setStatus("Failed");
    discoveredResourceHandlerConsoleImpl.saveResource(managedSystemResource);
    outcome.setStatus("Failed");
    String msg = "Unable to discover chassises for managed systems: " +
response.getStatusCode().getReasonPhrase();
    outcome.setMessage(msg);
    discoveryOutcomeRepository.save(outcome);
    throw new FatalDiscoveryException(msg);
}

ObjectMapper mapper = new ObjectMapper();
JsonNode hrefs = mapper.readTree(response.getBody()).get("Links").get("Members");

for (JsonNode singleHrefJson : hrefs) {
    String chassisPath = mapper.convertValue(singleHrefJson.get("href"), String.class);
    managedSystemResource.getChildren().put("Chassis", new URL(discoveryJob.getUrl().toString() +
chassisPath));
} managedSystemResource.setStatus("Discovered");
discoveredResourceHandlerConsoleImpl.saveResource(managedSystemResource);

ActorRef actor = null;
try {
    actor = getContext().actorOf(extention.props("chassisDiscoveryActor").withRouter(new FromConfig()),
"chassisDiscoveryActor");
} catch (Exception e) {
    throw new FatalDiscoveryException("unable to create an chassisDiscoveryActor " + e.getMessage(), e);
}
```

FIG. 8C

```
for (JsonNode singleHrefJson : hrefs) {
    String chassisPath = mapper.convertValue(singleHrefJson.get("href"), String.class);
    DiscoveredResource chassisResource = new DiscoveredResource();
    chassisResource.setType("Chassis");
    chassisResource.setPath(chassisPath);
    chassisResource.setUrl(discoveryJob.getUrl().toString());
    chassisResource.getParents().put("ManagedSystem", new URL(discoveryJob.getUrl().toString() + PATH));
    chassisResource.setOutcome(outcome.getId());
    DiscoveryMessage message = new DiscoveryMessage();
    message.setOutcome(outcome);
    message.setResource(chassisResource);
    message.setRestClient(GenericRestClient);
    message.setDiscoveryJob(discoveryJob);
    try {
        actor.tell(message, self());
    } catch (Exception e) {
        throw new FatalDiscoveryException("Unable to send a message to chassisDiscoveryActor: " + e.getMessage(), e);
    }
}
```

INFORMATION TECHNOLOGY INFRASTRUCTURE DISCOVERY UTILIZING DISCOVERY ADAPTERS

FIELD

The field relates generally to information technology infrastructure, and more particularly to managing information technology infrastructure.

BACKGROUND

Advanced forms of information technology (IT) infrastructure, including but not limited to cloud computing platforms, converged infrastructure (CI) platforms, software defined data centers (SDDCs), distributed infrastructure, and other types of processing platforms, are increasing in availability and usage. Management of such IT infrastructure by users, such as customers, companies, businesses, organizations or other enterprises, is a complex task. As IT infrastructure expands and new platforms, software, and other IT resources are released and become available or incorporated into such IT infrastructure, the complex task of IT management is increasingly difficult and costly.

SUMMARY

Illustrative embodiments of the present invention provide techniques for dynamic infrastructure discovery utilizing discovery adapters, which facilitates management of IT infrastructure.

In one embodiment, a method comprises building a registry of available discovery adapters, obtaining discovery data from information technology infrastructure, generating a discovery plan comprising a list of discovery adapters by matching one or more information technology resource types identified in the discovery data to information technology resource types associated with respective ones of the available discovery adapters, providing the discovery data to the discovery adapters in the list to execute a discovery run comprising the discovery adapters analyzing the discovery data and storing information on information technology resources in a discovered resources repository, and dynamically adjusting allocation of the information technology resources based on the information stored in the discovered resources repository, wherein the method is performed by at least one processing platform comprising one or more host devices implementing the discovery adapters.

The processing platform may be implemented, for example, in one or more network devices in a computer network, in a management system of an enterprise or in another type of management or analytics system associated with the computer network or an enterprise.

These and other illustrative embodiments include, without limitation, methods, apparatus, networks, systems and processor-readable storage media.

BRIEF DESCRIPTION OF THE DRAWINGS

FIGS. 8A-8D show pseudocode for implementing a discovery adapter in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
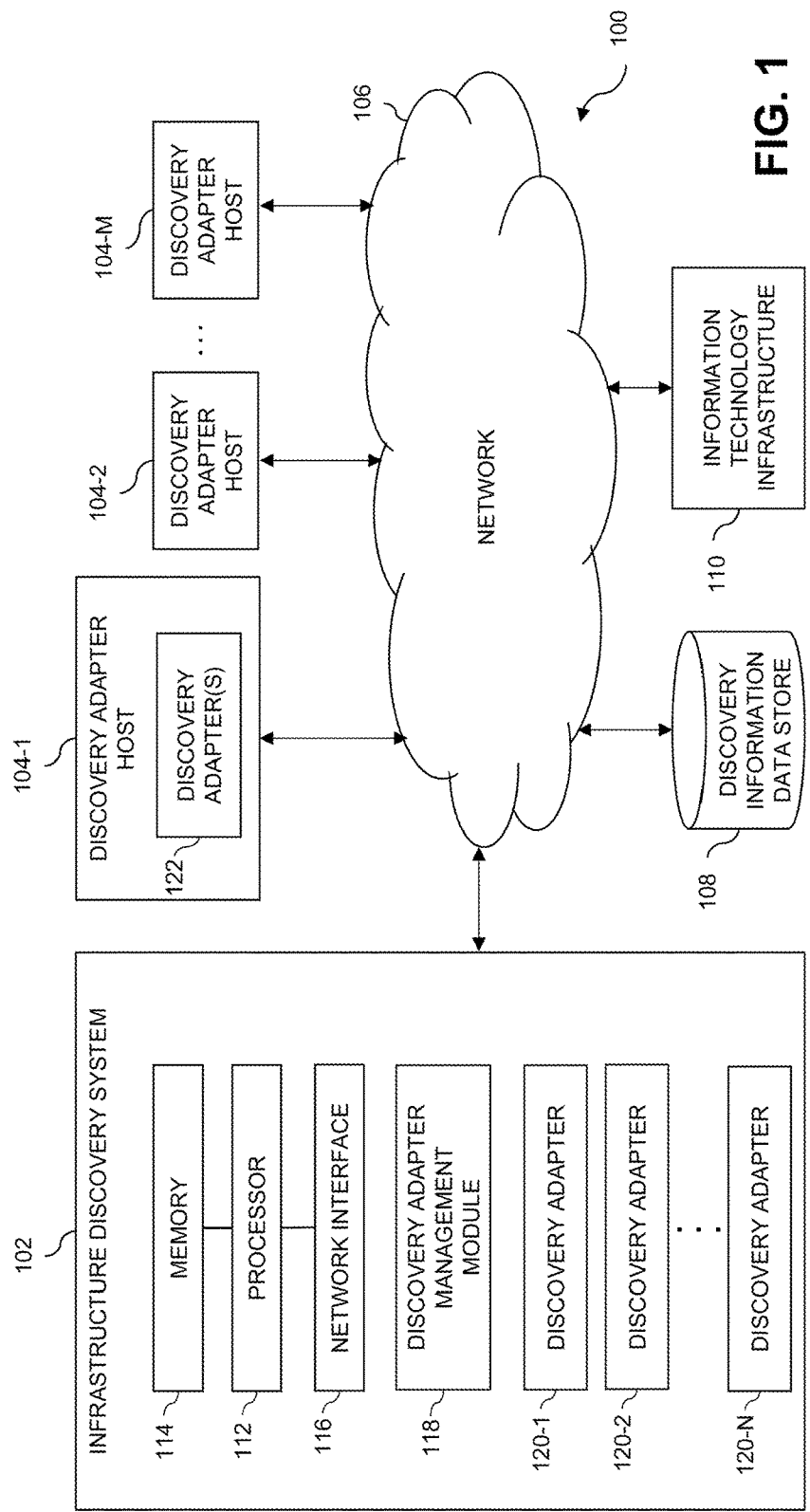
FIG. 1 is a block diagram of an information processing system for IT discovery utilizing discovery adapters in an illustrative embodiment of the invention.

FIG. 1 shows a computer network 100 configured in accordance with an illustrative embodiment of the invention. The computer network 100 comprises an infrastructure discovery system 102 and a plurality of discovery adapter host devices 104-1, 104-2, . . . 104-M, collectively referred to herein as discovery adapter host devices 104. As will be discussed in further detail below, in some embodiments the infrastructure discovery system 102 acts as one of the discovery adapter host devices 104. The infrastructure discovery system 102 and discovery adapter host devices 104 are coupled to a network 106, where the network 106 in this embodiment is assumed to represent a sub-network or other related portion of the larger computer network 100.

Accordingly, elements 100 and 106 are both referred to herein as examples of "networks" but the latter is assumed to be a component of the former in the context of the FIG. 1 embodiment. Also coupled to the network 106 is a discovery information data store 108 and IT infrastructure 110. The discovery information data store 108 may store information relating to discovered resources and discovery adapters, as will be described in further detail below.

Infrastructure discovery system 102 and discovery adapter host devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The infrastructure discovery system 102 and discovery adapter host devices 104 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The network 106 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

Infrastructure discovery system 102 in the FIG. 1 embodiment is assumed to be implemented using at least one processing device. Each such processing device generally comprises at least one processor and an associated memory, and implements one or more functional modules for controlling certain features of the infrastructure discovery system 102.

More particularly, the infrastructure discovery system 102 in this embodiment comprises a processor 112 coupled to a memory 114 and a network interface 116.

The processor 112 illustratively comprises a microprocessor, a microcontroller, an application-specific integrated circuit (ASIC), a field-programmable gate array (FPGA) or other type of processing circuitry, as well as portions or combinations of such circuitry elements.

The memory 114 illustratively comprises random access memory (RAM), read-only memory (ROM) or other types of memory, in any combination. The memory 114 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 116 allows the infrastructure discovery system 102 to communicate over the network 106 with the discovery adapter host devices 104, discovery information data store 108, IT infrastructure 110 and possibly other devices not shown in FIG. 1, and illustratively comprises one or more conventional transceivers.

The processor 112 further comprises discovery adapter management module 118, which is configured to implement dynamic infrastructure discovery algorithms and to manage discovery adapters implemented on the infrastructure discovery system 102 and discovery adapter host devices 104. As shown in FIG. 1, the infrastructure discovery system 102 implements discovery adapters 120-1, 120-2, . . . 120-N collectively referred to herein as discovery adapters 120. Discovery adapters 120, as will be discussed in further detail below, may comprise respective software modules that are associated with or otherwise capable of performing deep discovery for one or more designated types of IT resources. The particular number of discovery adapters 120 may vary, and in some cases the infrastructure discovery system 102 may not itself implement any discovery adapters. Discovery adapter management module 118 may additionally or alternatively cause one or more of the discovery adapter host devices 104 to implement one or more discovery adapters. For example, discovery adapter host device 104-1 is shown implementing discovery adapters 122. Although not explicitly shown, other ones of the discovery adapter host devices 104 may also implement one or more discovery adapters. Additional details regarding discovery adapter management module 118 and discovery adapters 120 and 122 will be described in further detail below with respect to FIGS. 2-8.

The discovery information data store 108, as discussed above, may be configured to store information relating to discovered resources in the IT infrastructure 110, as well as information relating to discovery adapters 120 and 122 that are implemented on infrastructure discovery system 102 and discovery adapter host devices 104.

The discovery information data store 108 in some embodiments is implemented using one or more storage devices associated with the infrastructure discovery system 102, the discovery adapter host devices 104 or the IT infrastructure 110. Such storage devices may comprise, for example, Islion® VxRAIL® and ScaleIO® products commercially available from EMC Corporation of Hopkinton, Mass. A variety of other storage products may be utilized to implement at least a portion of the storage devices associated with the infrastructure discovery system 102.

Although not explicitly shown in FIG. 1, one or more input-output devices such as keyboards, displays or other types of input-output devices may be used to support one or more user interfaces to the infrastructure discovery system 102 and/or discovery adapter host devices 104, as well as to support communication between the infrastructure discovery system 102, discovery adapter host devices 104, discovery information data store 108, IT infrastructure 110 and other related systems and devices not explicitly shown.

It is to be appreciated that the particular arrangement of the infrastructure discovery system 102, discovery adapter host devices 104, discovery information data store 108 and IT infrastructure 110 illustrated in the FIG. 1 embodiment is presented by way of example only, and alternative arrangements can be used in other embodiments. For example, the discovery information data store 108 may be implemented at least in part by one or more of the infrastructure discovery system 102, the discovery adapter host devices 104 and the IT infrastructure 110. As another example, the functionality associated with discovery adapter management module 118 may be separated across two or more modules with the multiple modules possibly being implemented with multiple distinct processors.

At least portions of the discovery adapter management module 118 may be implemented at least in part in the form of software that is stored in memory 114 and executed by processor 112.

It is to be understood that the particular set of elements shown in FIG. 1 for IT discovery is presented by way of illustrative example only, and in other embodiments additional or alternative elements may be used. Thus, another embodiment may include additional or alternative systems, devices and other network entities, as well as different arrangements of modules and other components.

By way of example, in other embodiments, the infrastructure discovery system 102 may be implemented at least in part internal to the IT infrastructure 110.

The infrastructure discovery system 102 may be implemented at least in part using one or more processing platforms including public or private cloud infrastructure, or other distributed virtual infrastructure. Such a distributed virtual infrastructure may comprise, by way of example, a hypervisor platform and associated virtual processing and storage elements. An example of a commercially available hypervisor platform suitable for use in an embodiment of the invention is the VMware® vSphere™ which may include an associated management system such as vCenter™.

Other processing platforms may be used to implement infrastructure discovery system 102 in other embodiments, such as different types of virtualization infrastructure in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company.

In some embodiments, alerts or notifications generated by the infrastructure discovery system 102, discovery adapter host devices 104 or by discovery adapters 120 and 122 implemented on the infrastructure discovery system 102 and discovery adapter host devices 104 may be provided over network 106 to IT infrastructure 110, or to a system administrator, IT manager, or other authorized personnel via one or more security agents. Such security agents may be implemented via the infrastructure discovery system 102, discovery adapter host devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the infrastructure discovery system 102 and discovery adapter host devices 104. For example, a given security agent may comprise a mobile telephone equipped with a mobile application configured to receive alerts from the infrastructure discovery system 102 or discovery adapter host devices 104 and to provide an interface for the security agent to select particular actions for responding to the alert or notification.

For example, on discovery of a new or unknown IT resource type in the IT infrastructure 110, the security agent may permit the user to initiate dynamic allocation of discovery adapters to respective ones of the host devices or to initiate creation of a new discovery adapter suited for the new IT resource type. The security agents may also be configured to respond to notifications regarding processing load by different ones of the discovery adapters 120 and 122 and/or regarding progress of a discovery run to permit one or more actions to be taken to dynamically adjust the number and types of discovery adapters based on the processing load or progress of the discovery run. The security agents may also monitor the computer network 100 to identify changes in status or availability of host devices such as infrastructure discovery system 102 and discovery adapter host devices 104 to dynamically adjust the numbers and types of discovery adapters. Various other examples of actions which may be taken by such security agents will be described in further detail below.

It should be noted that a "security agent" as the term is generally used herein may comprise an automated entity, such as a software entity running on a processing device. Accordingly, a security agent need not be a human entity.

An exemplary process for IT discovery will now be described in more detail with reference to the flow diagram of FIG. 2. It is to be understood that this particular process is only an example, and that additional or alternative processes for IT discovery can be carried out in other embodiments.

In this embodiment, the process includes steps 200 through 208. These steps are assumed to be performed by the processor 112 of the infrastructure discovery system 102 utilizing discovery adapter management module 118. The process begins with step 200, building a registry of available discovery adapters. Each discovery adapter may comprise a self-registered software module that includes one or more discovery application programming interfaces (APIs) that implement registration entry points for various types of IT resources, such as compute, storage and networking resources in IT infrastructure 110. Examples of such discovery APIs include but are not limited to Intelligent Platform Management Interface (IPMI) APIs, Storage Management Initiative (SMI) APIs, Windows Management Instrumentation (WMI) APIs and Simple Network Management Protocol (SNMP) APIs.

As discussed above, discovery adapters may be implemented by the infrastructure discovery system 102 (e.g., discovery adapters 120), by discovery adapter host devices 104 (e.g., discovery adapters 122), or by combinations of the infrastructure discovery system 102 and one or more of the discovery adapter host devices 104. The infrastructure discovery system 102 and each discovery adapter host device 104 may implement one or more different discovery adapters. A discovery adapter may be configured to discover multiple different types of IT resources using a single discovery API. Alternatively, a discovery adapter may be configured to discover only a single type of IT resource using a single discovery API. In some embodiments, the single IT resource type-single discovery API configuration is preferred due to scaling capabilities described in further detail below.

In some embodiments, step 200 includes utilizing a bootstrapper to search for available discovery adapters, invoking the registration entry points of the available discovery adapters to create an in-memory registry on the infrastructure discovery system 102, and mapping IT resource types to available discovery adapters. In some embodiments, building the registry of available discovery adapters in step 200 includes instantiating on the infrastructure discovery system 102 or one of the host devices 104 new discovery adapters that provide registration entry points for new IT resource types that are not mapped to an available discovery adapter.

Figure 2:
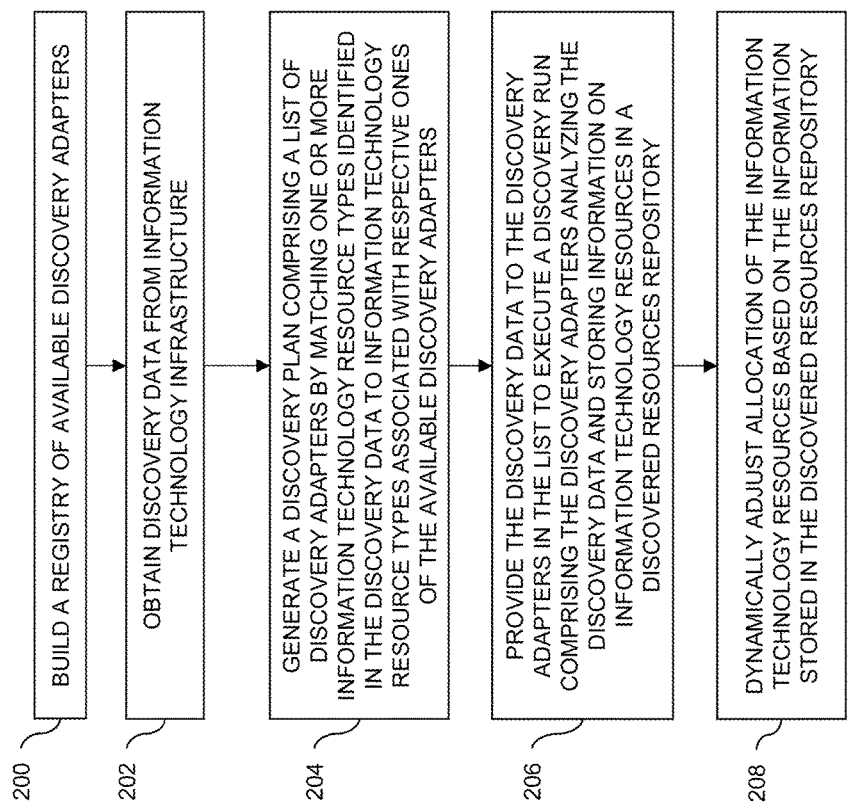
FIG. 2 is a flow diagram of an exemplary process for IT discovery utilizing discovery adapters in an illustrative embodiment.

The FIG. 2 process continues with step 202, obtaining discovery data from IT infrastructure 110. Discovery data may vary for different resources in the IT infrastructure 110. Examples of resource information include the name of the device, capacity and available capacity, bandwidth and available bandwidth, state such as up, down or running, health information such as running, in failure, etc. Resource information or properties, however, are not limited to these specific examples. This information is discovered from the IT resources in IT infrastructure 110 using one or more of the aforementioned discovery APIs. The discovery data may also include information about what devices or resources are in the IT infrastructure 110, such as how many VMAX® or VxRAIL® products are in a particular environment. Such information may be obtained from multiple locations or sources, such as by manual user input, a configuration database, monitoring using IMPI or another discovery API, network scanning, etc. Discovery data in some embodiments may also include access credentials for the IT resources to allow discovery adapters to access and discover the IT resources. Such credentials, which may include but are not limited to passwords, keys and certificates or other account information, may be user-provided with appropriate privilege levels.

In step 204, a discovery plan comprising a list of discovery adapters is generated. The discovery plan is generated by matching one or more IT resource types identified in the discovery data to respective ones of the available discovery adapters in the registry of available discovery adapters. Generating the discovery plan in step 204 in some embodiments includes selecting scale factors that control the number of discovery adapters associated with each of the IT resource types identified in the discovery data. The scale factors may be dynamically adjusted during a discovery run based on the processing loads for different IT resource types.

In step 206, the discovery data is provided to the discovery adapters in the list to execute a discovery run comprising the discovery adapters analyzing the discovery data and storing information on IT resources in a discovered resources repository. The discovered resources repository may be part of the discovery information data store 108, and may be stored in the infrastructure discovery system 102, on one or more of the discovery adapter host devices 104, in the IT infrastructure 110, etc.

Executing the discovery run in step 206 may include traversing a resource tree comprising two or more levels. The registration entry points for the discovery adapters may be associated with IT resources at different levels of the resource tree. Storing information on the IT resources in the discovered resources repository in step 206 may include tagging each IT resource with a unique identifier associated with the current discovery run. As will be described in further detail below, such tagging can eliminate the need for change detection in the IT infrastructure 110.

In some embodiments, each discovery adapter executes the discovery run by finding a given IT resource to be discovered and determining whether that discovery adapter is capable of discovering the given IT resource by mapping the type of the given IT resource to a list of supported IT resource types for that discovery adapter. If the discovery adapter is capable of discovering the resource type of the given IT resource, the discovery adapter saves detailed information about the given IT resource in the discovered resources repository and marks the given IT resource as discovered. If the discovery adapter is not capable of discovering the resource type of the given IT resource, the discovery adapter saves basic information about the given IT resource in the discovered resources repository and marks the given IT resource as not discovered. In some embodiments, basic information for an IT resource includes information such as the resource type, resource identifier, resource address relationships between the given IT resource and other IT resources in the IT infrastructure 110 while detailed information for the IT resource includes all of the basic information plus other information such as serial numbers, resource subtypes, names, vendors, etc. Examples of detailed and basic information for IT resources will be described in further detail with respect to FIG. 7.

In step 208, allocation of the IT resources is dynamically adjusted based on the information stored in the discovered resources repository. The IT resources, for example, may be shared amongst a group of users or among multiple tasks associated with an enterprise. Utilizing the information on discovered IT resources, the infrastructure discovery system can dynamically adjust the allocation of IT resources amongst such users and/or tasks. For example, on discovering that an IT resource previously allocated for use by a particular user or task has been deleted from IT infrastructure 110, the infrastructure discovery system 102 can choose to assign another IT resource to that user or task. As another example, on discovering new or upgraded IT resources which would result in better performance for a task or improve Quality of Service (QoS) for a particular user based on the discovered IT resources, the infrastructure discovery system 102 can add or remove IT resources that are assigned or allocated amongst different users or tasks.

In some embodiments, step 208 involves use of the above-described security agents providing notifications or alerts to an IT manager or other user associated with the IT infrastructure 110. Such notifications or alerts can trigger actions, automatically or after approval by such users, to change the allocation of IT resources in the IT infrastructure 110. Such notifications or alerts may also be provided to the users or IT resources within the IT infrastructure 110. For example, users may be alerted regarding the availability of IT resources in the IT infrastructure which may improve performance for their tasks or processing loads. IT resources within the IT infrastructure 110 may also be sent notifications or alerts that could trigger one or more APIs of such resources to cause that resource to be allocated to a particular user or task, to advertise its availability, etc. The information stored in the discovered resources repository may also be used in numerous other application areas, such as in recommending upgrades to the IT infrastructure 110, load balancing of IT resources in the IT infrastructure 110, and various other processes facilitating management of the IT infrastructure 110.

As users move to more advanced and complex types of IT infrastructure, such as CI, SDCC and cloud computing environments, such users may not want to or have the ability to manage IT infrastructure. Thus, it is more difficult to have a true understanding of what the IT infrastructure such as IT infrastructure 110 has to offer and what platforms are deployed in the IT infrastructure. New platforms, software, hardware and other types of IT resources are being released all the time, and detecting such new releases within a reasonable type and without significant cost in terms of resource usage presents a challenging task. A resource discovery or monitoring system such as infrastructure discovery system 102, for example, should not generally utilize a large percentage of the resources in the IT infrastructure 110 or other platform to monitor and expose its features.

Dynamic discovery techniques described herein in some embodiments utilize a reactor enterprise pattern for infrastructure detection. Such dynamic discovery techniques allow for building a flexible, scalable and easily configurable infrastructure discovery system such as infrastructure discovery system 102. Features of such techniques, as will be detailed below, can eliminate the need for change detection and deletion handling which can cause errors in conventional monitoring or discovery systems. The dynamic discovery techniques used in some embodiments are suited for newer CI platforms and take into account new components or resources added to the CI platforms or IT infrastructure 110 that the discovery process may not know how to completely handle. Dynamic discovery techniques utilized in some embodiments also meet the need to balance resources needed to discovery and monitoring of IT infrastructure 110 with the user's requirements for otherwise utilizing the resources in IT infrastructure 110.

Fully discovering a CI platform that can contain new modules, components or other IT resources can be difficult. Once fully discovered, keeping that information up-to-date for decision in a management and orchestration (M&O) layer is also important. Without a deep and correct understanding of the available resources in the platform, problems can arise leading to incorrect deployments and inefficient utilization of resources. Dynamic discovery techniques described herein can thus lead to more efficient usage of compute, storage and networking resources in IT infrastructure 110.

Some resources in IT infrastructure 110 may generate notifications or messages to facilitate discovery. However, since not all resources in the IT infrastructure 110 provide such messaging, reliance on such messaging may not lead to a full and complete understanding of the capabilities of IT infrastructure 110. In addition, such messaging may cause full discoveries of the platform to happen over and over again. Another disadvantage to relying solely on self-reported notifications or messaging from IT resources is in regard to detecting when modules, components or other IT resources are removed from a system. Understanding whether a particular device or resource is temporarily unavailable or actually removed from the platform or IT infrastructure 110 is difficult with minimal human interaction.

IT infrastructure 110 may change often or continually, and thus may not be considered stable from a discovery perspective as both hardware and software IT resources are constantly added, removed and upgraded or otherwise modified. For example, new storage technologies are developed and deployed continually, new applications are installed on host devices or other hardware in IT infrastructure 110, and new computing nodes are introduced to IT infrastructure 110. Handling new and previously not supported types of IT resources introduces challenges for infrastructure discovery. Implementation of software responsible for the discovery of such new IT resource types may require rebuilding or redeployment of an entire discovery system using conventional approaches. As will be described in further detail below, the use of the self-registered software module discovery adapters in some embodiments provides a mechanism for dynamic deployment of the discovery adapters needed for discovery of infrastructure components or IT resources in IT infrastructure 110 without requiring rebuilding or redeployment of the entire infrastructure discovery system 102.

Infrastructure discovery is a long running and resource intensive process. Discovering some of the infrastructure components may require a long time or consume significant computing resources. Also, the number and type of IT resources to be discovered may be unknown at the time discovery begins. A consumer/producer pattern may partially solve scalability issues, but is often not sufficient for IT infrastructure discovery. In some embodiments, the discovery process is fine-tuned by providing dedicated computing resources to the "heavy" discovery parts with the ability to "scale up" and "scale out" patterns where the infrastructure discovery system 102 controls the number of instances of discovery adapters dedicated to discovery of different IT resource types, as well as the computing resources of the infrastructure discovery system 102 and discovery adapter host devices 104 allocated for different instances of the discovery adapters. In some embodiments, the infrastructure discovery system 102 also controls the particular computing hosts within IT infrastructure 110 on which discovery adapters are executed. As mentioned above, the infrastructure discovery system 102 and discovery adapter host devices 104, while shown as external to IT infrastructure 110 in FIG. 1 for clarity of illustration, may themselves be implemented at least partially internal to or within IT infrastructure 110.

Change detection is also an important part of infrastructure discovery. Change detection, for example, may be required in order to determine if a discovered resource is new or has been previously discovered, to determine if an IT resource no longer exists or has been deleted, etc. Change detection algorithms can require significant computing resources, with deletion detection being particularly challenging since it demands knowledge of previous discoveries. As will be described in detail below, some embodiments facilitate change detection and deletion detection through the use of tagging resources with discovery run identifiers.

In some embodiments, dynamic infrastructure discovery techniques provide a scalable and easily configurable and extendable algorithm that eliminates the need for change detection using self-registered discovery adapters, mapping of IT resource types to individual discovery adapters, and tagging discovered resources with discovery identifiers.

Figure 3:
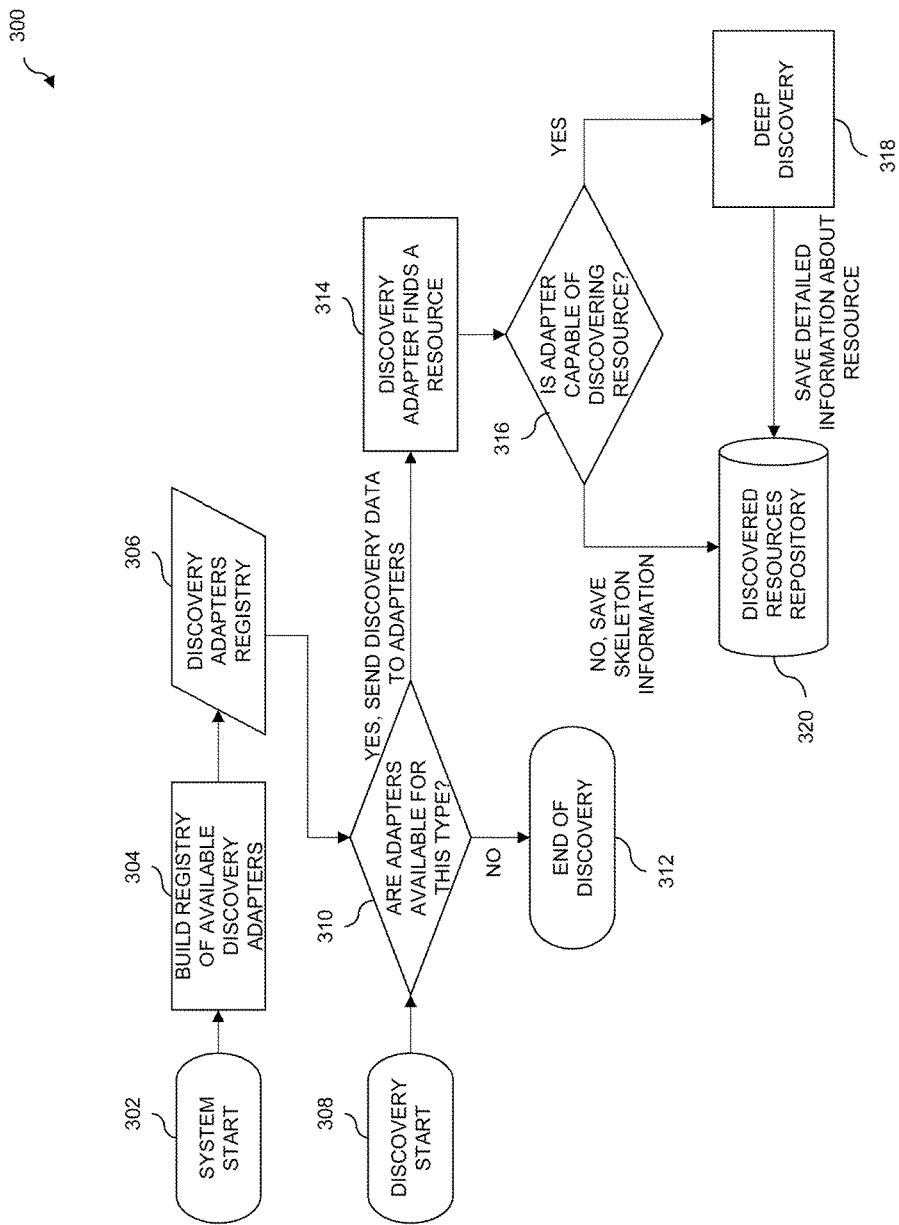
FIG. 3 is a flow diagram of an exemplary discovery process in an illustrative embodiment.

FIG. 3 shows a discovery process flow 300. The flow 300 begins with step 302, where the infrastructure discovery system 102 is started. In step 304, a registry of available discovery adapters is built. This registry is shown as discovery adapters registry 306 in the flow 300. The discovery adapters registry 306 may be stored in-memory at the infrastructure discovery system 102 or at least partially external to the infrastructure discovery system 102 such as in discovery information data store 108. Once the discovery starts in step 308, the discovery adapters registry 306 is used to match a discovery type to the types advertised by the registered discovery adapters. Discovery types, in some embodiments, indicate the depth of discovery. For example, the discovery types may indicate whether a quick scan or full deep discovery is performed. In step 310, it is determined whether there are available adapters for the discovery type. If there are no available discovery adapters for the discovery type, the discovery ends in step 312. When a discovery adapter is not found to match the type of an element or resource that needs to be discovered, a skeleton or base object is instantiated representing the element to be discovered. The skeleton or base object acts as a placeholder in the larger data structure, such that the infrastructure discovery system 102 can determine whether new discovery adapters are needed. Discovery ends once these steps are done. Otherwise, the infrastructure discovery system 102 builds the list of discovery adapters which will be provided with the discovery data.

The list of discovery adapters may include a subset of the available discovery adapters, which are selected based on the type of elements or resources being discovered. If an element or resource to be discovered does not have a discovery adapter loaded, new or updated discovery adapters may be instantiated.

If the determination in step 310 indicates that there are discovery adapters available for the discovery type, the discovery data is sent to the discovery adapters in the list. In step 314, a given one of the discovery adapters in the list finds a resource. The discovery data may include the credentials or other information needed to access the resource. If discovery needs to be scaled, such that multiple discovery adapters need to access the same element endpoint, each scaled actor or discovery adapter receives a copy of the discovery data. Resources include, but are not limited to, IT resources such as hardware (e.g., compute, storage and network resources) and software installed on such hardware.

In step 316, a determination is made, by the discovery adapter that found the resource in step 314, whether that discovery adapter is capable of discovering the resource. Step 316, in some embodiments, involves the discovery adapter matching the resource type with its own capabilities. If the discovery adapter is capable of performing the discovery for the resource type, it executes deep discovery in step 318 and writes detailed resource information into discovered resources repository 320. If the discovery adapter cannot process the resource type, the discovery adapter stores skeleton or basic information in the discovered resources repository 320.

Discovery adapters, such as discovery adapters 120 and 122, may be implemented as software modules that are responsible for discovery of one or more CI or IT resources. The discovery adapters are self-registered, in that each discovery adapter implements a registration entry point. The registration entry points provide a service registry stating what the respective discovery adapters can handle, such as particular IT resource types, and the arguments needed by the discovery adapters to perform its discovery tasks.

Upon startup of the infrastructure discovery system 102, a bootstrapper searches for present discovery adapters and invokes their registration entry points. In some embodiments, discovery adapters define APIs known to the infrastructure discovery system 102, and are placed or downloaded into specified directories or other locations which the bootstrapper knows to scan. Thus, upon startup the specified directories or other locations are scanned and the discovery adapters are registered. In some embodiments, discovery adapters use service endpoints that all discovery adapters know how to find, such as a "localhost:8080/x/x/x" location. Combinations of these and other techniques may be used by the bootstrapper to search for present discovery adapters and invoke their registration entry points. In some embodiments, this creates an in-memory registry mapping CI or IT technologies to the discovery adapters. If a new IT technology is introduced, a new discovery adapter may be copied to the system so that it can be scanned by the bootstrapper.

Figure 4:
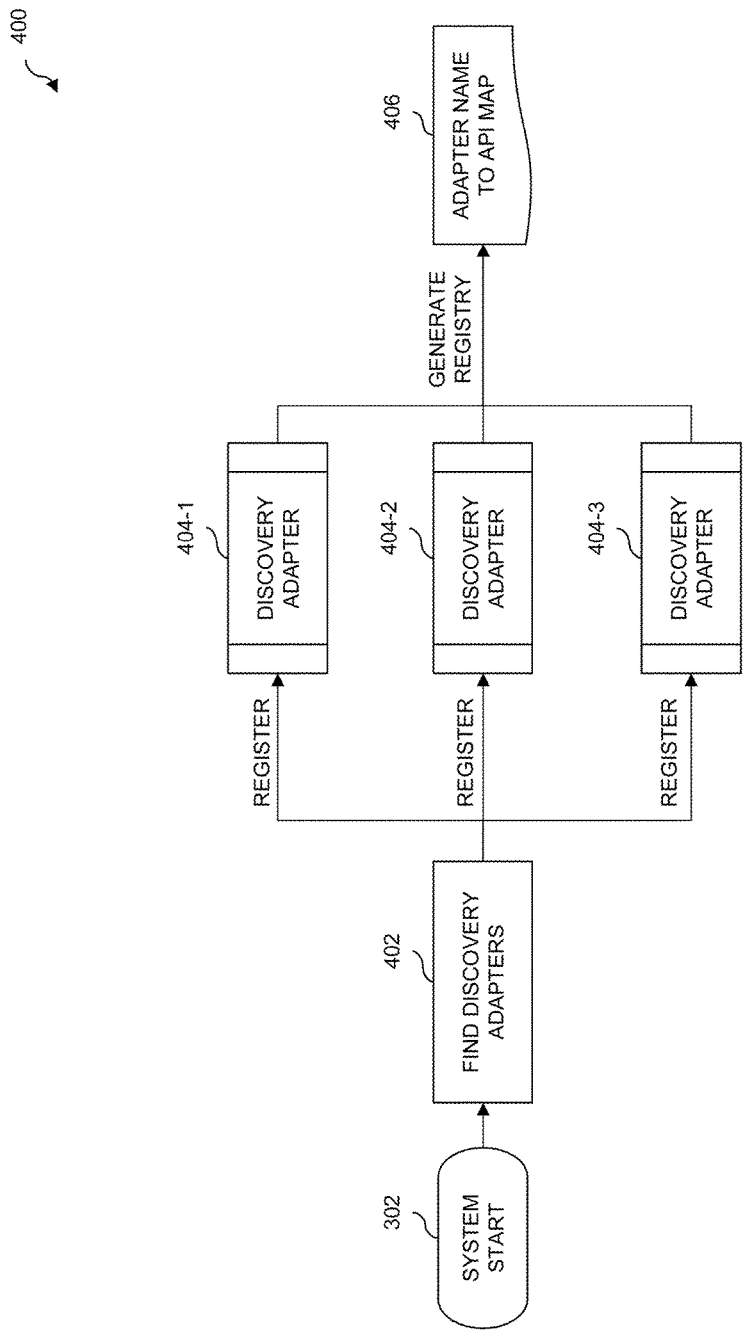
FIG. 4 is a flow diagram of an exemplary process for generation of a discovery adapter registry in an illustrative embodiment.

FIG. 4 shows a discovery adapter registry generation flow 400. The flow 400 may be performed by the infrastructure discovery system 102 in conjunction with the flow 300 described above with respect to FIG. 3. As shown, the flow 400 also begins with step 302, system startup. In step 402, the infrastructure discovery system 102 finds discovery adapters using the bootstrapper. In this example, the result of step 402 is finding three discovery adapters 404-1, 404-2 and 404-3, collectively referred to herein as discovery adapters 404. The particular number of discovery adapters found may vary in other embodiments. Discovery adapters 404 are registered to generate the discovery adapters registry 306 described above with respect to flow 300, and shown in FIG. 4 as the adapter name to API map 406. Each of the discovery adapters 404 can implement one or more discovery APIs, such as IPMI, SMI, WML, SNMP, etc. A discovery adapter may be configured to discover multiple resource types with the same discovery API, or may be configured to discover a single resource type. In some embodiments, it may be preferred to have each discovery adapter configured to discover a single type of IT resource due to the scaling capabilities of the framework described elsewhere herein. If such a single IT resource type of discovery adapter detects sub or child elements or resources for a particular IT resource, another discovery adapter can be instantiated for discovery of such sub or child resources. The granularity of discovery adapters can vary as desired, to cover a ranged from fine grained to course grained discovery.

Figure 5:
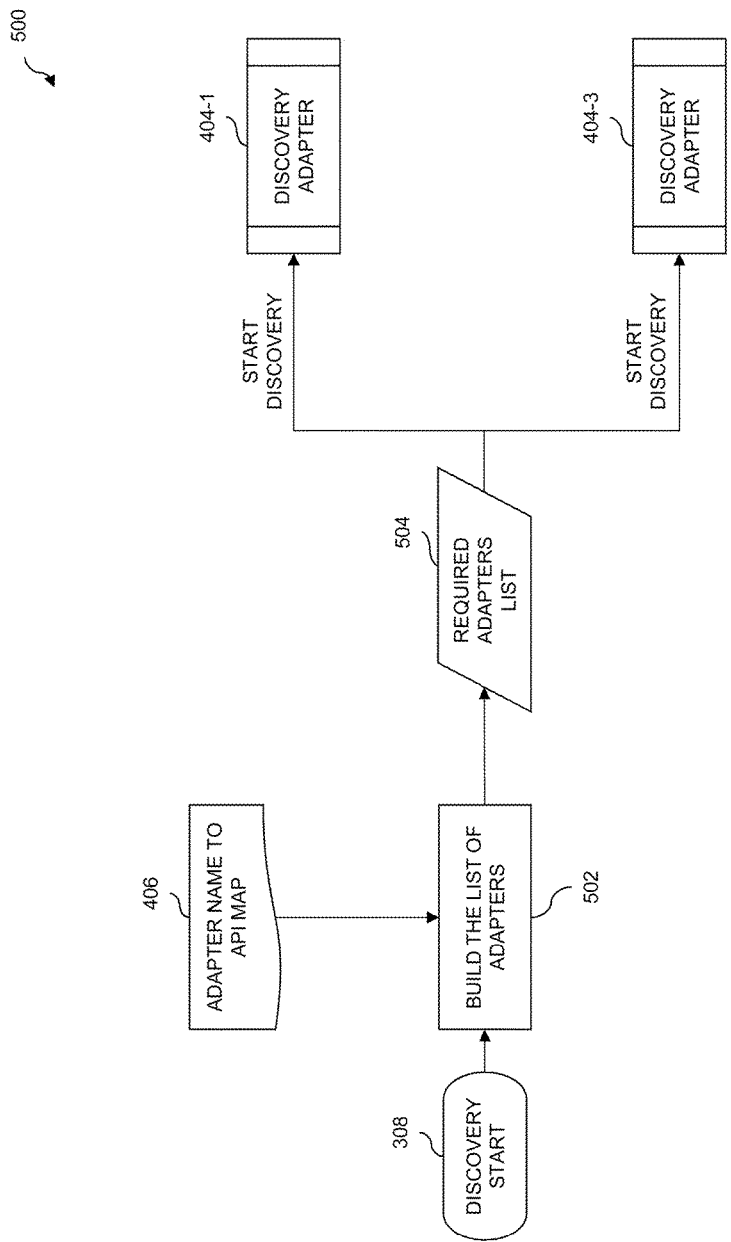
FIG. 5 is a flow diagram of an exemplary process for matching discovery adapters in an illustrative embodiment.

FIG. 5 shows a flow 500 for matching discovery adapters. The flow 500 may be implemented by infrastructure discovery system 102 and may be used in conjunction with flows 300 and 400 as described below. The flow 500 begins with step 308 from flow 300, starting discovery. In step 502, a discovery plan is created using information from the adapter name to API map 406 generated from flow 400, or more generally from information in discovery adapters registry 306. Generating the discovery plan in step 502 includes building a list of required adapters 504. Discovery data is provided to the discovery adapters in the required adapters list 504, which in the FIG. 5 example includes discovery adapter 404-1 and discovery adapter 404-3 but not discovery adapter 404-2. It is to be appreciated, however, that in other embodiments the required adapters list may include more or fewer than two discovery adapters, such as all of the discovery adapters 404 including discovery adapter 404-2 or more generally any or all of the discovery adapters in the discovery adapters registry 306.

As discussed above, CI and other platforms such as IT infrastructure 110 may rapidly deploy new types of resources. In some cases, the available discovery adapters or the adapters in the required adapters list 504 may not be able to support all of them. Even if a discovery adapter is not capable of processing or discovering certain resources, it may be useful to still record basic information about the resources, such as the skeleton information referred to with respect to flow 300. Each discovery adapter may be configured to internally maintain a list of resource types that it is capable of discovering. If the discovery adapter encounters a resource which needs to be discovered it attempts to match the resource type with its internal list of supported resource types. If the discovery adapter is unable to process the resource, the discovery adapter records the basic or skeleton information for the resource such as its resource type, identifier, address, relation to other resources, etc. The discovery adapter, however, will mark the resource as not discovered to ensure the integrity and completeness of discovery data and in particular the infrastructure resource relationships.

Figure 6:
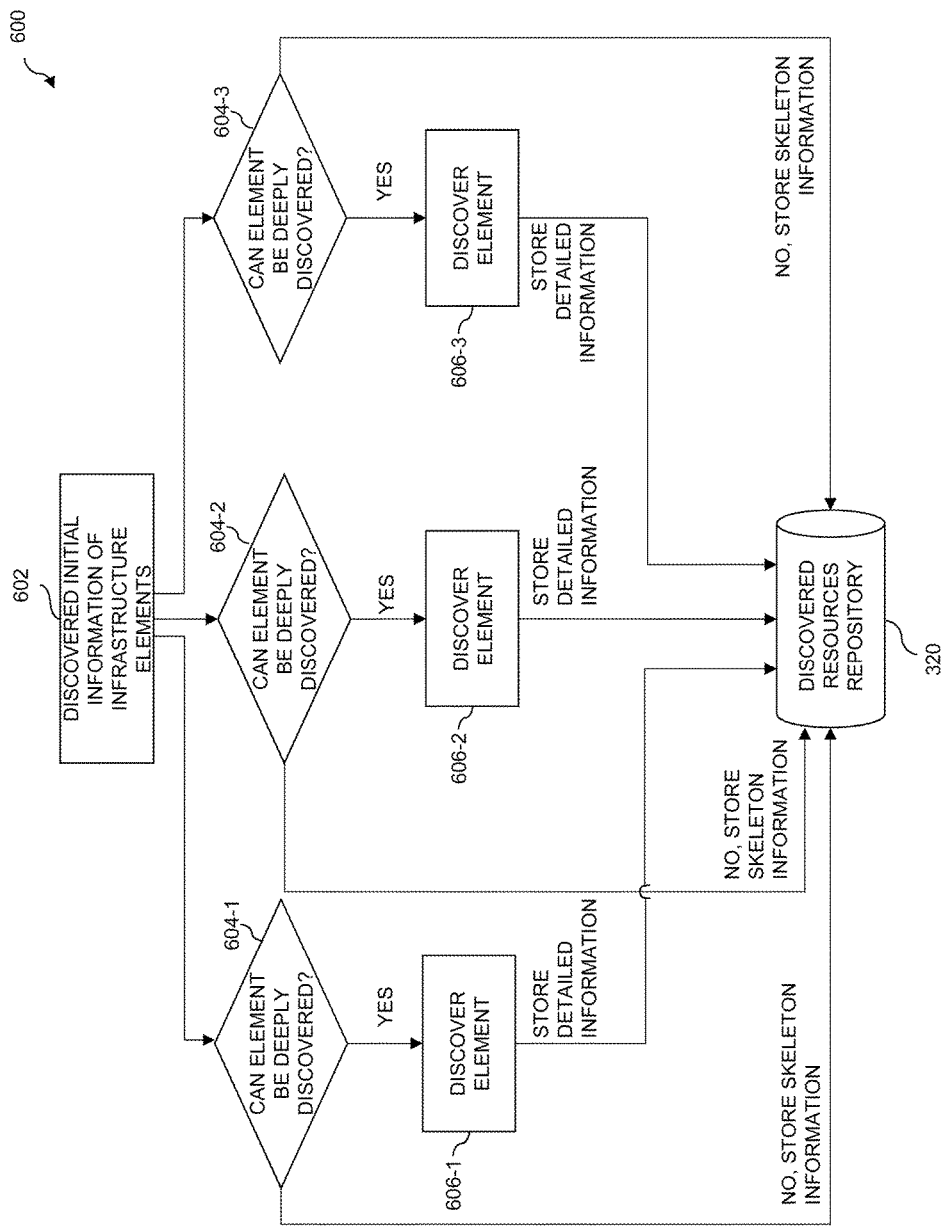
FIG. 6 is a flow diagram of an exemplary process for resource matching in an illustrative embodiment.

FIG. 6 shows a flow 600 of resource matching, which may be performed by the discovery adapters 120 and/or 122 on infrastructure discovery system 102 and discovery adapter host devices 104. The flow 600 may be used in conjunction with flows 300, 400 and 500. In step 602, initial information of one or more infrastructure elements is discovered. Step 602 may be viewed as basic or skeleton discovery. Each discovery adapter may be configured to perform step 602 for a given resource, regardless of whether that discovery adapter is configured to support the resource type of the given resource. In steps 604-1, 604-2 and 604-3, respective discovery adapters such as discovery adapters 404-1, 404-2 and 404-3, determine whether they are capable of performing deep discovery for the infrastructure elements or resources. The steps 604-1, 604-2 and 604-3 are collectively referred to herein as step 604. If the result of the determination in step 604 is no for a given discovery adapter, the flow 600 continues with that discovery adapter storing the skeleton information in the discovered resources repository 320. If the result of the determination in step 604 is yes, the flow 600 proceeds with deep discovery in step 606-1, 606-2 and/or 606-3 for each discovery adapter configured to support the resource type of a given infrastructure element or resource and detailed information is stored in the discovered resources repository 320.

In some cases, multiple discovery adapters detect the same IT resource. For example, if a first discovery adapter scans the IT resource and creates a skeleton object for that resource, subsequent discovery adapters that detect the IT resource can append data to that skeleton object. The skeleton object may contained a uniform resource identifier (URI) for the IT resource, and thus even if the IT resource is discovered from two or more different discovery APIs or discovery adapters, the URI for that resource is still unique and only additive data is stored in the discovered resources repository 320 rather than duplicate entries for the IT resource.

The flows 300, 400, 500 and 600 provide for dynamic discovery, in which discovery adapters are initialized and used to scan discovery data utilizing a reactor pattern enabling flexibility and scalability required for CI and other platforms. Since the discovery process can be long running and resource intensive, simply splitting resource or infrastructure discovery into multiple parallel running threads may not be sufficient since it may lead to a host device running out of computing resources. The reactor pattern used for discovery adapters allows for fine-tuning the discovery process by allocating resources to the parts of the discovery, such as particular resource types, that really need it. Resource discovery may also be de-centralized by offloading heavy processing loads to other hosts. For example, the infrastructure discovery system 102 may adjust the numbers of discovery adapters that it and the discovery adapter host devices 104 implement so as to provide such offloading. The processing load may be automatically managed by utilizing reactive streams, such as dynamically switching between push and pull patterns. Some discovery APIs, such as WMI and SMI, allow for registering events when elements or IT resources change thus providing for push patterns. Pull patterns may be performed as desired for IT resources by invoking one or more discovery APIs.

Most discovery systems implement some form of change or deletion detection. The goal of change or deletion detection is to determine if a discovered resource is new or was previously discovered, and to determine whether a resource has been deleted or decommissioned. Change detection algorithms usually require that a set of immutable properties be established for each resource type. The set of immutable properties uniquely identifies each instance, and if it does not change than the resource is considered to be the same. Queries identifying if a resource has changed are usually complex and their execution can be time consuming. Deletion detection can be even more challenging, often requiring retaining a previously discovered CI state and comparing it to data obtained by a current discovery run.

In some embodiments, such challenging techniques for change and deletion detection may be eliminated. For example, each discovery run by the infrastructure discovery system 102 can generate a unique identifier (ID), and every resource that is discovered during a particular discovery run is tagged with a combination of discovery IDs and discovery run IDs. A discovery ID may uniquely identify an IT resource within a discovery run, with the discovery run ID uniquely identifying the discovery run itself. For example, an IT resource may have the same discovery ID for two different discovery runs. Change detection is facilitated by the use of discovery IDs in combination with the tagged discovery run IDs. Change and deletion detections do not need to be performed. In order to retrieve the discovered resources, a simply query such as "give me all the resources with latest discovery ID" can be performed. Such a query may further specify a discovery run ID to retrieve the discovered resources for a particular discovery run. In addition to simplifying querying for discovered resources, an additional benefit is that since resources are not overwritten but just added to the discovered resources repository 320 or discovery information data store 108, it is always possible to see how an individual resource has changed over time, such as by comparing information using queries based on different discovery run IDs.

When a discovery process or discovery run starts, discovery may begin with a high-level resource such as a rack, brick or appliance. The high-level resource may be specified, or a listener responding to an IPMI broadcast message or other discovery API message may be received. Based on the high-level resource, an appropriate discovery adapter or discovery adapters are searched for. When the suitable discovery adapter or adapters are located they are executed. As the list of additional resources is created, the discovery adapter for each is located and executed. Discovery adapters may be executed in parallel with one another or in sequence based on the capabilities of the discovery adapters and desired resources that discovery can consume. As the resource tree is traversed and discovery progress is made the collected information is stored and persisted. This process continues until the entire resource tree has been traversed.

As processing platforms such as CI, SDCC, cloud computing and IT infrastructure become more module based discovery becomes more complex. Modules may refer to central processing units (CPUs), memory, persistent storage, FPGAs, graphic processing units (GPUs), etc. When new modules are discovered, they are matched to an appropriate discovery adapter to execute deep discovery. If no discovery adapter is found or is available for the new module, the new module is thin discovered creating a placeholder for the module and an attempt is made to discover any sub-modules or other modules that are lower in the resource tree fully. Once an appropriate discovery adapter is created and/or located for the new module, a deeper discovery process is executed. This is facilitated as execution of a discovery process can start at any given point in the resource tree.

Figure 7:
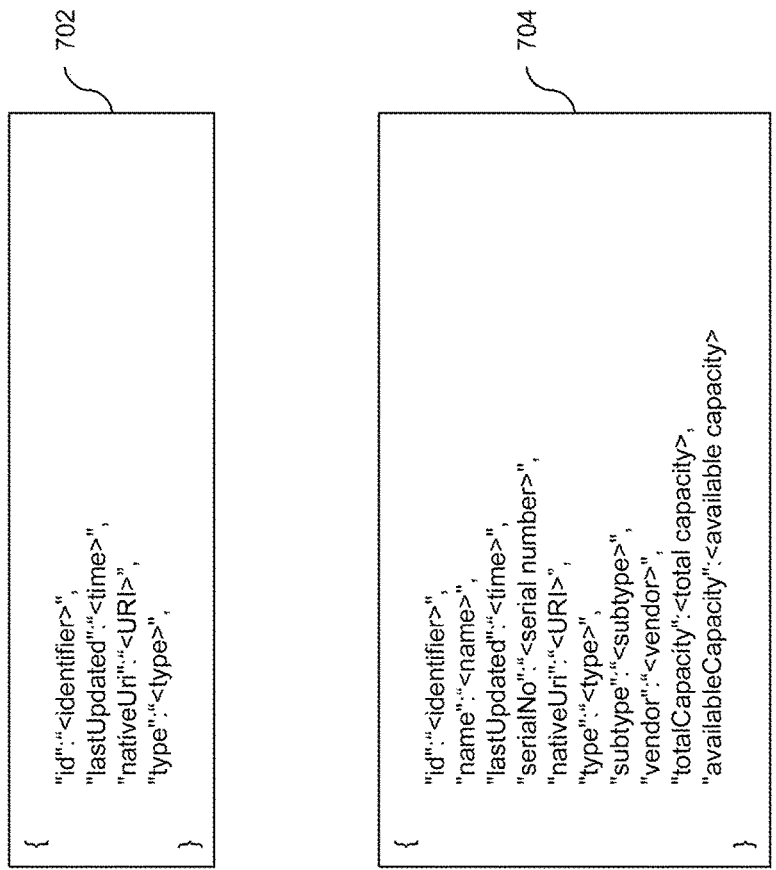
FIG. 7 shows examples of skeleton information and detailed information for a resource in an illustrative embodiment.

FIG. 7 shows examples of skeleton information 702 and detailed information 704 for a resource. As shown, the skeleton information 702 includes an identifier, a last updated time, a Uniform Resource Identifier (URI) and a type. The detailed information includes all of the skeleton information 702 plus a name, serial number, subtype, vendor, total capacity and available capacity. The total and available capacity may vary by resource type, such as indicating total and available storage for storage resources, total and available bandwidth for network resources, total and available processing cycles for compute resources, etc. As a more particular example, consider a VMAX® storage system. The skeleton information may identify the VMAX storage system as having a type "storage system." The detailed information for the VMAX storage system may indicate its network name, serial number, subtype within the storage system type (e.g., "VMAX storage system"), its vendor (e.g., VMAX) and its total and available capacity in bytes. It is to be appreciated that the skeleton information 702 and detailed information 704 shown in FIG. 7 is presented by way of example, and that embodiments are not limited to storing the exact types of information shown in the figure.

FIGS. 8A-8D show portions 800-1, 800-2, 800-3 and 800-4, respectively, of pseudocode which may be utilized to implement a discovery adapter. The portions 800-1, 800-2, 800-3 and 800-4 are collectively referred to herein as pseudocode 800. While the pseudocode 800 is shown written in the Java language, this is not a requirement. Other types of programming languages may be used to implement a discovery adapter in other embodiments.

Portion 800-1 of the pseudocode 800 sets up an object that will be used for discovery. Portion 800-2 of the pseudocode 800 executes the discovery of a top-level element. Portion 800-3 of the pseudocode 800 parses the results of the top-level container and dispatches other discovery adapters for next level discovery if necessary. Portion 800-4 of the pseudocode 800 shows all levels of discovery being executed, where the data is then parsed and stored. It is to be appreciated that the pseudocode 800 shown is presented by way of example for a generic product. The pseudocode 800 may be adjusted for different types of products or IT resources as needed. Further, while pseudocode 800 describes portion 800-2 as executing discovery of a top-level element, this reference is not necessarily with respect to the top level of a particular resource tree but may instead refer simply to the highest level of the resource tree that the discovery adapter is designed for. As described elsewhere herein, discovery adapters may begin a scan at any point of a resource tree based on the registration entry points.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
    building a registry of available discovery adapters;
    obtaining discovery data from information technology infrastructure;
    generating a discovery plan comprising a list of discovery adapters by matching one or more information technology resource types identified in the discovery data to information technology resource types associated with respective ones of the available discovery adapters;
    providing the discovery data to the discovery adapters in the list to execute a discovery run comprising the discovery adapters analyzing the discovery data and storing information on information technology resources in a discovered resources repository; and
    dynamically adjusting allocation of the information technology resources based on the information stored in the discovered resources repository;
    wherein the method is performed by at least one processing platform comprising one or more host devices implementing the discovery adapters;
    wherein generating the discovery plan comprises identifying scale factors used to select respective numbers of discovery adapters associated with each of the information technology resource types identified in the discovery data;
    further comprising dynamically adjusting the scale factors during the discovery run based on processing loads for different information technology resource types; and
    wherein dynamically adjusting the scale factors comprises adjusting amounts of compute, storage and networking resources of the one or more host devices allocated for different instances of the discovery adapters.

2. The method of claim 1 wherein the discovery adapters comprise respective self-registered software modules each comprising one or more discovery application programming interfaces implementing at least one registration entry point for one or more types of information technology resources.

3. The method of claim 2 wherein the one or more discovery application programming interfaces comprise at least one of:
    an Intelligent Platform Management Interface (IPMI) application programming interface;
    a Storage Management Initiative (SMI) application programming interface;
    a Windows Management Instrumentation (WMI) application programming interface; and
    a Simple Network Management Protocol (SNMP) application programming interface.

4. The method of claim 2 wherein building the registry of available discovery adapters comprises utilizing a bootstrapper to search for available discovery adapters and invoking the registration entry points of the available discovery adapters to create an in-memory registry mapping information technology infrastructure resource types to the available discovery adapters.

5. The method of claim 2 wherein executing the discovery run comprises traversing a resource tree comprising two or more levels, wherein the registration entry points of two or more of the discovery adapters are associated with information technology resources types at different ones of the two or more levels of the resource tree.

6. The method of claim 2 wherein the registration entry points of the discovery adapters provide a service registry specifying particular types of information technology resources that the discovery adapter can handle and arguments used by the discovery adapters to perform discovery tasks.

7. The method of claim 1 wherein a given one of the discovery adapters is configured to discover multiple information technology resource types using a single application programming interface.

8. The method of claim 1 wherein a given one of the discovery adapters is configured to discover a single information technology resource type using a single application programming interface.

9. The method of claim 1 wherein building the registry of available discovery adapters comprises, in response to identifying a new information technology resource type not mapped to at least one of the available discovery adapters, instantiating a new discovery adapter providing a registration entry point for the new information technology resource type.

10. The method of claim 1 wherein at least two of the discovery adapters are implemented on a single host device in said at least one processing platform.

11. The method of claim 1 wherein a first one of the discovery adapters is implemented on a first host device in a first processing platform and a second one of the discovery adapters is implemented on a second host device in a second processing platform.

12. The method of claim 1 wherein said at least one processing platform comprises a cloud computing environment.

13. The method of claim 1 wherein the discovery adapters analyzing the discovery data and storing information on information technology resources in the discovered resources repository comprises a given one of the discovery adapters:
    finding a given information technology resource to be discovered;
    determining whether the given discovery adapter is capable of discovering the given information technology resource;

responsive to determining that the given discovery adapter is capable of discovering the given information technology resource, performing deep discovery, saving detailed information about the given information technology resource in the discovered resources repository and marking the given information technology resource as discovered; and responsive to determining that the given discovery adapter is not capable of discovering the given information technology resource, saving basic information about the given information technology resource in the discovered resources repository and marking the given information technology resources as not discovered.

14. The method of claim 13 wherein the basic information about the given information technology resource comprises:
a resource type;
a resource identifier;
a resource address; and
one or more relationships of the given information technology resource to other information technology resources in the information technology infrastructure.

15. The method of claim 1 wherein storing information on the information technology resources in the discovered resources repository comprises tagging each information technology resource with a first unique identifier associated with the discovery run and a second unique identifier that identifies that information technology resource within the discovery run.

16. The method of claim 1 wherein dynamically adjusting the scale factors further comprises moving at least one discovery adapter from a first one of the host devices to a second one of the host devices.

17. A computer program product comprising a non-transitory processor-readable storage medium having stored therein program code of one or more software programs, wherein the program code when executed by at least one processing platform comprising one or more host devices implementing discovery adapters causes the at least one processing platform:
to build a registry of available discovery adapters;
to obtain discovery data from information technology infrastructure;
to generate a discovery plan comprising a list of discovery adapters by matching one or more information technology resource types identified in the discovery data to information technology resource types associated with respective ones of the available discovery adapters;
to provide the discovery data to the discovery adapters in the list to execute a discovery run comprising the discovery adapters analyzing the discovery data and storing information on information technology resources in a discovered resources repository; and
to dynamically adjust allocation of the information technology resources based on the information stored in the discovered resources repository
wherein generating the discovery plan comprises identifying scale factors used to select respective numbers of discovery adapters associated with each of the information technology resource types identified in the discovery data;
wherein the program code when executed further causes the at least one processing platform to dynamically adjust the scale factors during the discovery run based on processing loads for different information technology resource types; and
wherein dynamically adjusting the scale factors comprises adjusting amounts of compute, storage and networking resources of the one or more host devices allocated for different instances of the discovery adapters.

18. The computer program product of claim 17 wherein the discovery adapters comprise respective self-registered software modules each comprising one or more discovery application programming interfaces implementing at least one registration entry point for one or more types of information technology resources.

19. An apparatus comprising:
at least one processing platform comprising one or more host devices implementing discovery adapters;
the at least one processing platform being configured:
to build a registry of available discovery adapters;
to obtain discovery data from information technology infrastructure;
to generate a discovery plan comprising a list of discovery adapters by matching one or more information technology resource types identified in the discovery data to information technology resource types associated with respective ones of the available discovery adapters;
to provide the discovery data to the discovery adapters in the list to execute a discovery run comprising the discovery adapters analyzing the discovery data and storing information on information technology resources in a discovered resources repository; and
to dynamically adjust allocation of the information technology resources based on the information stored in the discovered resources repository;
wherein generating the discovery plan comprises identifying scale factors used to select respective numbers of discovery adapters associated with each of the information technology resource types identified in the discovery data;
wherein the at least one processing platform is further configured to dynamically adjust the scale factors during the discovery run based on processing loads for different information technology resource types; and
wherein dynamically adjusting the scale factors comprises adjusting amounts of compute, storage and networking resources of the one or more host devices allocated for different instances of the discovery adapters.

20. The apparatus of claim 19 wherein the discovery adapters comprise respective self-registered software modules each comprising one or more discovery application programming interfaces implementing at least one registration entry point for one or more types of information technology resources.

* * * * *